(12) United States Patent
Kessels

(10) Patent No.: US 12,351,040 B2
(45) Date of Patent: Jul. 8, 2025

(54) POWER MANAGEMENT SYSTEM FOR ELECTRICAL VEHICLES WITH MULTIPLE MOTORS

(71) Applicant: DAF Trucks N.V., Eindhoven (NL)

(72) Inventor: Johannes Theodorus Bernard Anna Kessels, Heide (NL)

(73) Assignee: DAF Trucks N. V., Eindhoven (NL)

( * ) Notice: Subject to any disclaimer, the term of this patent is extended or adjusted under 35 U.S.C. 154(b) by 73 days.

(21) Appl. No.: 17/911,517

(22) PCT Filed: Mar. 16, 2021

(86) PCT No.: PCT/NL2021/050178
§ 371 (c)(1),
(2) Date: Sep. 14, 2022

(87) PCT Pub. No.: WO2021/187978
PCT Pub. Date: Sep. 23, 2021

(65) Prior Publication Data
US 2023/0356604 A1 Nov. 9, 2023

(30) Foreign Application Priority Data
Mar. 16, 2020 (NL) ....................................... 2025138

(51) Int. Cl.
*B60L 15/20* (2006.01)
*F16D 27/118* (2006.01)
*H02P 5/747* (2006.01)

(52) U.S. Cl.
CPC ....... *B60L 15/2054* (2013.01); *B60L 15/2045* (2013.01); *B60L 2210/40* (2013.01);
(Continued)

(58) Field of Classification Search
CPC ............. B60L 15/2054; B60L 15/2045; B60L 2210/40; B60L 2220/42; B60L 2240/421;
(Continued)

(56) References Cited

U.S. PATENT DOCUMENTS

| 2011/0111906 A1* | 5/2011 | Kim | ........................ F16H 3/728 475/5 |
| 2012/0019172 A1 | 1/2012 | Zing et al. | |

(Continued)

FOREIGN PATENT DOCUMENTS

| CN | 106696759 A | 5/2017 | |
| CN | 108422847 A * | 8/2018 | ............... B60K 6/20 |

(Continued)

OTHER PUBLICATIONS

Du, Machine Translation of CN-108422847-A (Year: 2018).*
International Search Report and Written Opinion—PCT/NL2021/050178—mailing date Sep. 23, 2021.

*Primary Examiner* — Anne Marie Antonucci
*Assistant Examiner* — Patrick Daniel Mohl
(74) *Attorney, Agent, or Firm* — Banner & Witcoff, Ltd.

(57) ABSTRACT

A power management system is disclosed for an electrically driven vehicle, comprising a powertrain of at least two electric motors that can be selectively geared into the powertrain. The power management system is configured to indicate a level of mechanical power demanded from the powertrain, to estimate an electrical power demand from a respective one of the at least two electric motors as a function of the demanded mechanical power, and to activate or deactivate the respective electric motor in response to the mechanical power demand indicator. The power management system is further configured to (a) deactivate the respective electric motor when (1) the demanded mechanical power does not exceed a maximum value with the respective electric motor deactivated, and (2) the estimated electric (Continued)

power with the respective electric motor deactivated is lower than that with the respective electric motor activated; or otherwise (b) activate the respective electric motor.

22 Claims, 8 Drawing Sheets

(52) U.S. Cl.
CPC ..... *B60L 2220/42* (2013.01); *B60L 2240/421* (2013.01); *B60L 2240/423* (2013.01); *B60L 2240/507* (2013.01); *F16D 27/118* (2013.01); *H02P 5/747* (2013.01)

(58) Field of Classification Search
CPC ......... B60L 2240/423; B60L 2240/507; B60L 50/00; F16D 27/118; H02P 5/747; Y02T 10/64; Y02T 10/72
See application file for complete search history.

(56) References Cited

U.S. PATENT DOCUMENTS

| | | | |
|---|---|---|---|
| 2012/0029741 A1 | 2/2012 | Gleason et al. | |
| 2012/0245783 A1* | 9/2012 | Tamagawa | B60W 10/06 180/65.265 |
| 2012/0264555 A1* | 10/2012 | Robinette | B60K 6/445 475/5 |
| 2013/0184923 A1* | 7/2013 | Sawayama | B60L 15/20 903/930 |
| 2015/0239466 A1* | 8/2015 | Harada | B60W 10/115 903/903 |
| 2015/0298574 A1* | 10/2015 | Bramson | B60L 15/2045 701/22 |
| 2015/0321661 A1* | 11/2015 | Hayashi | B60W 20/40 180/65.265 |
| 2015/0336569 A1* | 11/2015 | Matsubara | B60W 10/196 180/65.265 |
| 2016/0347203 A1* | 12/2016 | Leng | B60L 50/60 |
| 2019/0299806 A1* | 10/2019 | Oyama | H01M 10/425 |
| 2020/0223314 A1* | 7/2020 | Curuvija | H01M 10/44 |
| 2020/0298822 A1* | 9/2020 | Miyamoto | B60K 17/356 |
| 2021/0008968 A1* | 1/2021 | McGrew, Jr. | B60L 5/12 |
| 2021/0123441 A1* | 4/2021 | Coupart | H02P 5/747 |
| 2021/0309089 A1* | 10/2021 | McGrew, Jr. | B60L 15/2045 |

FOREIGN PATENT DOCUMENTS

| | | |
|---|---|---|
| CN | 110466362 A | 11/2019 |
| DE | 19932118 C1 | 10/2000 |
| DE | 102010031156 A1 | 1/2012 |
| DE | 102014223224 A1 | 8/2015 |
| DE | 102015206674 A1 | 10/2015 |
| EP | 2116412 A2 | 11/2009 |

\* cited by examiner

POWER MANAGEMENT SYSTEM FOR ELECTRICAL VEHICLES WITH MULTIPLE MOTORS

CROSS-REFERENCE TO RELATED APPLICATIONS

This application is a U.S. National Stage application under 35 U.S.C. § 371 of International Application PCT/NL2021/050178 (published as WO 2021/187978 A1), filed Mar. 16, 2021 which claims the benefit of priority to Application NL 2025138, filed Mar. 16, 2020. Benefit of the filing date of these prior applications is hereby claimed. Each of these prior applications is hereby incorporated by reference in its entirety.

FIELD OF INVENTION

The invention relates to a power management system for electrical vehicles. The invention also relates to a power management method for an electrically driven vehicle comprising a powertrain of at least two electric motors that can be selectively geared into the powertrain and that are powered by an electric power source. The invention further relates to a computer program product for putting into effect the method.

DESCRIPTION OF THE PRIOR ART

One of the main differences between (heavy) commercial vehicles and passenger cars is the broad range of payload to be handled by trucks. For trucks, it is common practice to install an engine/e-motor with a higher power rating when higher payloads are expected. But instead of installing one large e-motor for hybrid and electric trucks, it is very well possible to install multiple smaller e-motors and select the number of motors according to the requested power rating. A default (state-of-art) scenario is that all e-motors with inverters are always active and the requested torque demand is equally split over all e-motors. When high power is requested, this is a valid approach because all e-motors together are needed to deliver the requested power. During partial load, however, the requested power can be delivered by a subset and switching off one or more e-motors. The invention aims to control the power/torque of a hybrid/powertrain which is equipped with two or more than two e-motors. By means of smart controlling the power of the individual e-motors and/or related inverters, their efficiency and lifetime can be extended.

SUMMARY OF THE INVENTION

In one aspect, it is aimed to provide a power management system for an electrically driven vehicle that comprises a powertrain of at least two electric motors that can be selectively geared into the powertrain and an electric power source for powering the at least two electric motors. The power management system comprises a mechanical power demand indicator, indicating a level of mechanical power demanded from the powertrain, and an electrical power demand estimator, arranged to estimate an electrical power demand from the electric power source of a respective one of the at least two electrical motors as a function of the demanded mechanical power. The power management system is arranged to activate or deactivate a respective one of said at least two electric motors in response to the mechanical power demand indicator. The power management system is further arranged to deactivate a respective one of the at least two electric motors when the power management system detects that the demanded mechanical power does not exceed a maximum value for the powertrain having a respective one of said at least two electric motors deactivated; and that the estimated electric power demanded by the powertrain having the respective one of said at least two electric motors deactivated, is lower than the powertrain having the respective one of said at least two electric motors activated; or otherwise activate the respective one of the at least two electric motors.

Accordingly, the power management system can optimize a torque control, and at the same time efficiently control the electrical power demand for the powertrain.

BRIEF DESCRIPTION OF THE DRAWINGS

The invention will be further elucidated in the figures.

DETAILED DESCRIPTION

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

Figure 1:
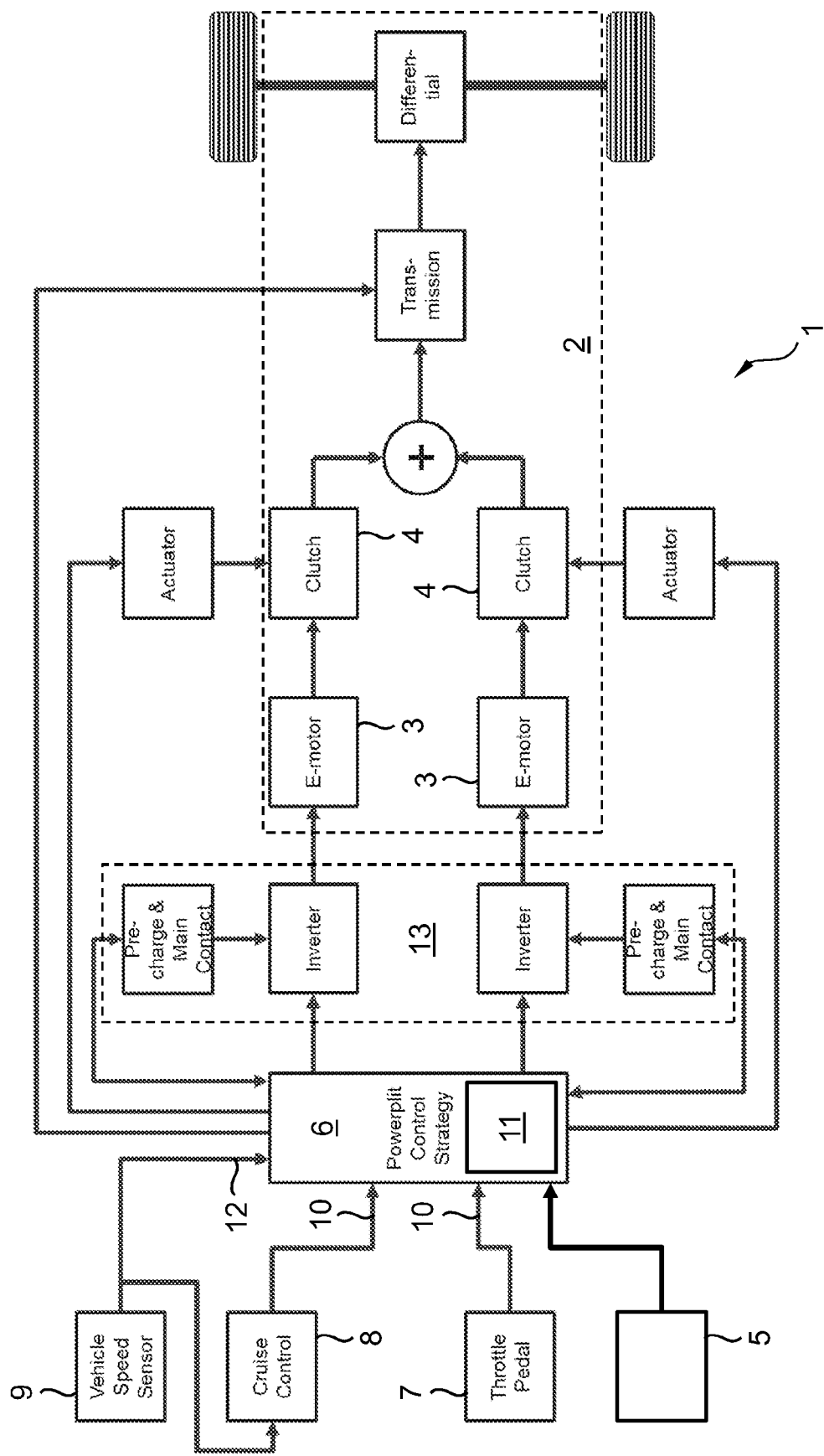
FIG. 1 shows a schematic layout for an electrically driven vehicle.

Turning to FIG. 1, there is disclosed a schematic layout for an electrically driven vehicle 1, that comprises a powertrain 2 of at least two electric motors 3 that can be selectively geared by clutches 4 into the powertrain. The invention is not limited to the topology shown in this figure, but generally applies to all kinds of powertrains where multiple e-motors and/or transmissions are installed. E.g. a powertrain where the transmission allows for providing torque to the wheels whereas shifting still can take place. These powertrains can include a Dual-Clutch Transmission (DCT) or can have completely separated transmissions as shown in FIG. 1. Torque interruption can be prevented by scheduling an up- or downshift for each e-motor at a different moment in time. Note that no torque interruption during shifting is attractive for acceleration as well as regenerative braking. An electric power source 5 is applied for powering the electric motors 3, amongst others, which in the figure show two, but can be more than two motors. Power management system 6 comprises a mechanical power demand indicator 10 indicating a level of mechanical power demanded from the powertrain 2. This power demand indicator 10 can for example, but not limited thereto, be formed by outputs of a throttle pedal 7, a cruise control system 8 and/or a speed sensor 9.

These outputs 10 are fed to an electrical power demand estimator module 11, that may be embodied in the power management system that is arranged to estimate an electrical power demand from the electric power source 5 of a respective one of the at least two electrical motors 3 as a function of the demanded mechanical power 10. The requested and actual power demand can be obtained in multiple ways e.g. may be inputted from throttle pedal 7 or the vehicle speed, or use the current through the e-motor (measured by the inverter) as well to determine how much power the e-motor is delivering. The estimator module 11 may be programmed with a control algorithm that continuously monitors how the throttle pedal 7 is operated by the driver. For example, if the driver requests a moderate power demand the power management system 6 comprises control logic to switch off one or more e-motors. But once the throttle pedal is pressed deeply (high power demand), the power management system 6 comprises control logic to switch on extra inverters and e-motors. Such can be done by activating the charge system 13. Power management 6 thereby controls, i.e. activates or deactivates the e-motors 3, specifically, in response to the mechanical power demand indicator 10.

Thus the estimator module 11, as part of the power management system 6, comprises circuits and control logic that may be embodied in any structural hardware or software arrangement having a capability of executing program logic. A skilled person is typically aware of how to operate or implement such a circuit in the context of the description. The control logic of the estimator module 11 can calculate an expected demand of electrical power, and may be embodied in a circuit, subroutine or otherwise a calculation device, as a function of vehicle speed sensor output 12, and charge system 13.

Figure 2:
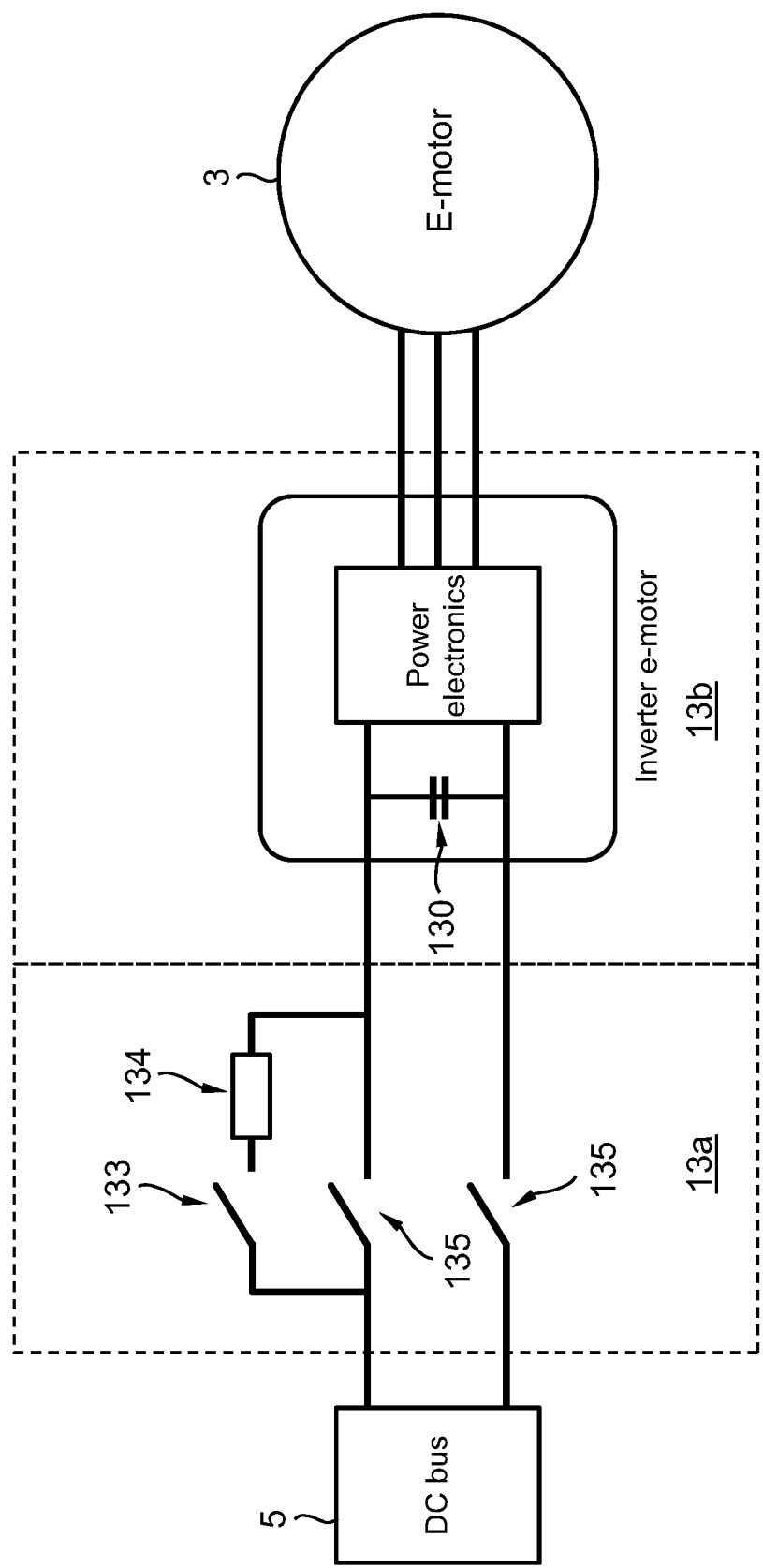
FIG. 2 shows a typical setup for a high voltage charge system

FIG. 2 shows a typical setup for a charge system 13 of the type shown in FIG. 1. It typically includes an inverter device 13b, i.e. a DC-AC converter to regulate the current flow through the e-motor (such that the e-motor rotates with the right speed and torque). In fact, the inverter 13b converts a Direct Current (DC) from the primary power source 5 into an Alternating Current (AC) on the secondary side that is connected to e-motor 3. To avoid noise ripples on the primary side, the inverter device typically comprises an internal capacitor 130 at the input side to stabilize the DC bus. The lifetime of this capacitor 130 is directly related to the time duration that high voltage is applied; and to extend the lifetime of the inverter 13b, it can be disconnected from the high voltage bus 5 by a pre-stage circuit 13a. To switch off the invertor device 13B including capacitor 130, pre-stage 13a comprises an additional contact circuit, in parallel to a main contact circuit 135 to relay the electrical current to the power inverter 13b. The contact circuits can be formed by contactors 133 or relays known in the art. The additional contact circuit comprises a pre-charge resistor 134 for each inverter. Note that the capacitor value in the inverter as well as the value of the pre-charge resistor are selected as small as possible, to keep the pre-charge time as short as possible.

To prevent that the driver experiences a delay in torque, it is important that the start-up time of the extra e-motors is as short as possible. This can be achieved by a synchronization strategy for the e-motors, where maximum torque is requested from the e-motors. The e-motor which is not connected to the driveline has a low inertia and therefore spins up as fast as possible to the set speed. Note that the e-motor which is already connected to the driveline also is requested to deliver maximum torque, such that the driver experiences the best possible torque response. In case the control logic of the estimator 11 calculates an expected demand of electrical power power management system 6 that an extra e-motor needs to be connected to the driveline, the control strategy from FIG. 6 takes the following synchronization steps:

Step 1: Close pre-charge contactors
Step 2: Close main contactors when pre-charge current is below threshold value
Step 3: Inverter requests max. torque from e-motor and e-motor spins-up
Step 4: Inverter reduces torque request when e-motor speed comes close to drivetrain speed
Step 5: Close clutch when e-motor speed matches with drivetrain speed
Step 6: Connected E-motor will deliver torque to drivetrain.

In some embodiments, the inverter device is kept switched on; e.g. when the power management system detects that a time averaged variability of the mechanical power demand is registered that exceeds a predetermined threshold. In such case the power management system will not deactivate an e-motor since there is an expectation that it is needed shortly afterwards.

Figure 3:
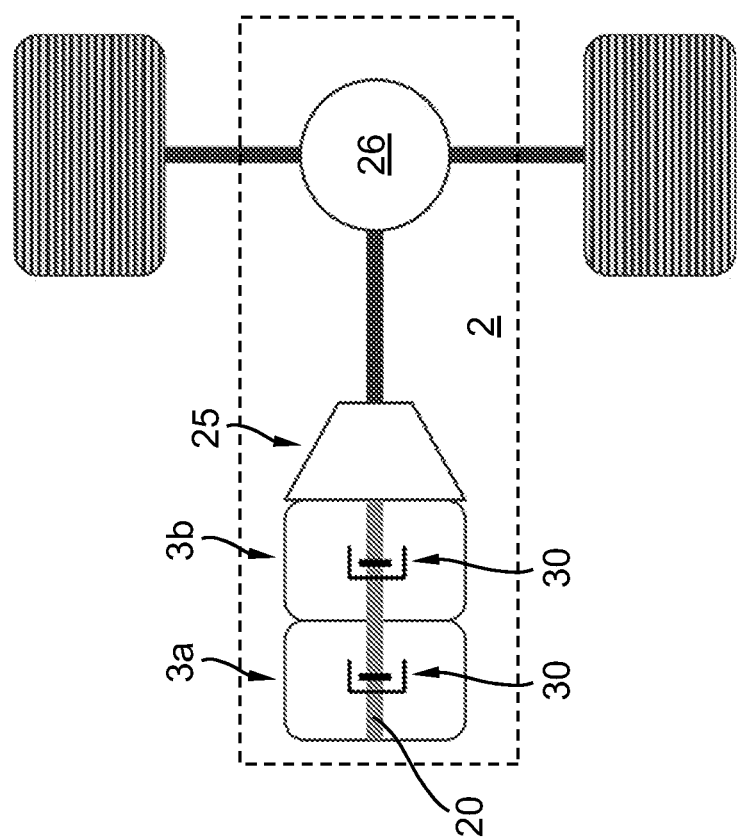
FIG. 3 shows a schematic detail of a driveline configuration

FIG. 3 shows a schematic detail of a driveline configuration 2 for two or more e-motors 3 coupled linearly in series e.g. on a single drive shaft 20 that is outputted to a transmission 25. The transmission furthermore conventionally connects to the wheels via a differential 26. The e-motors can be of a permanent magnet design or of the induction type. Especially in case of a permanent magnet design, there will be remaining cogging losses, when the e-motor is switched off but still rotating because it is mechanically coupled to the drive line. Nevertheless, e-motors having a permanent magnet design have generally higher energy densities and peak power efficiencies. To further obtain an efficiency improvement the one-or more e-motors 3 can be not only electrically deactivated by switching of the pre-charge circuit 13A (see FIG. 2), but also mechanically uncoupled from the driveline 2, when not activated by the power management system 6. When disabling one or more e-motors, the requested torque can be delivered by the remaining e-motor(s) in the driveline 2, which is controlled by the power management system 6. Particularly when an e-motor 3 of a permanent magnet type is switched off cogging losses due to the mechanical coupling remain and have a substantial impact on the potential efficiency improvements. An induction motor—without permanent magnet—does not suffer from cogging losses but still bearing losses will be present and create a drag loss. To eliminate this dependency on drag and cogging losses, e-motor 3 is deactivated by the power management system by mechanically gearing off from the powertrain by a respective clutch 30 that is coupled to each of said at least two electric motors 3a, 3b. Mechanical clutch 30 (e.g. dog clutch) is provided between each e-motor 3 and the drive shaft 2 so that drag- and cogging losses are no longer present when the e-motor 3 is switched off and the clutch 30 is open. For each clutch a corresponding actuator is provided, which are preferably electromagnetic actuators (instead of the traditional pneumatic actuators) to reduce noise levels which are important for electric vehicles.

Figure 4:
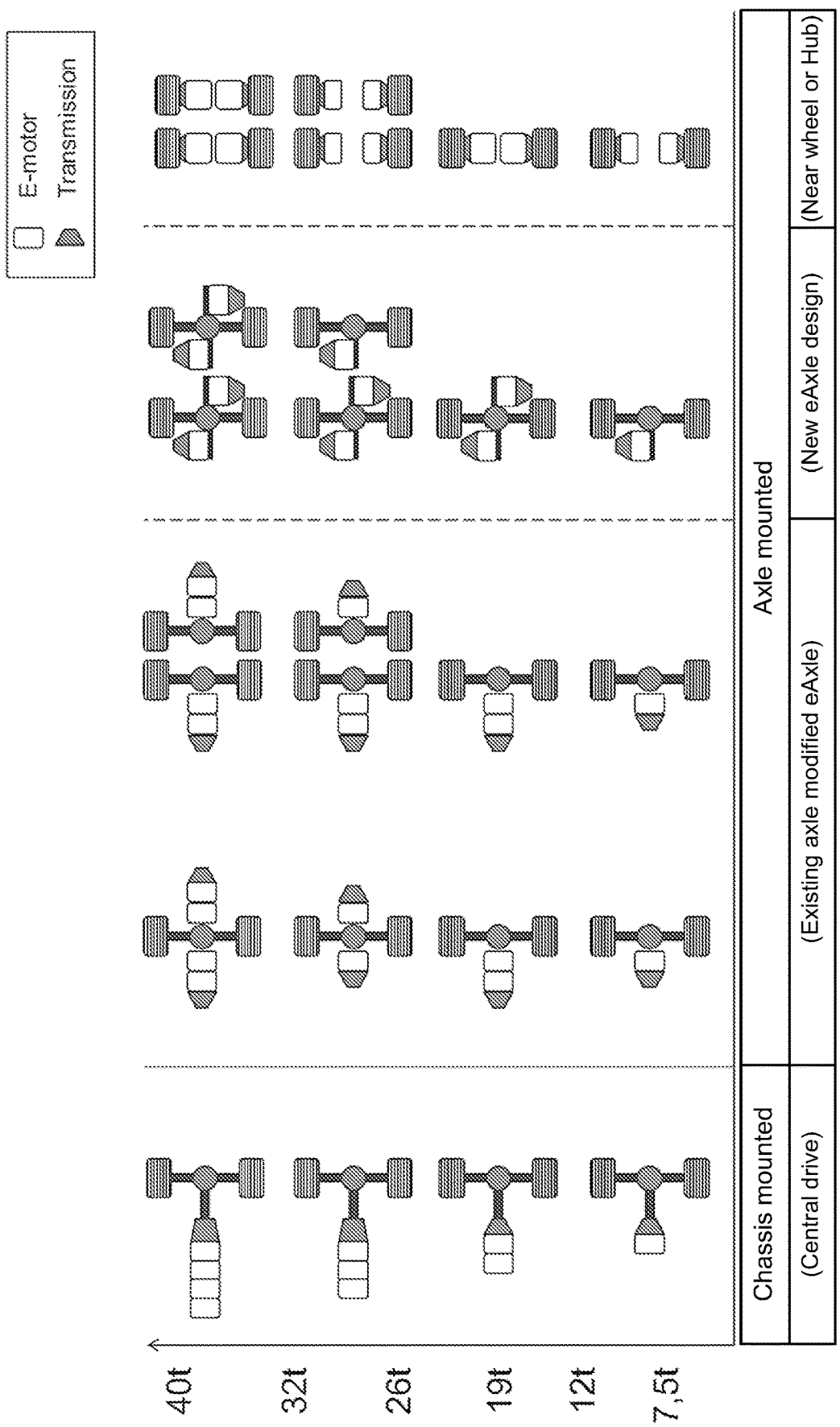
FIG. 4 shows a variety of e-motor driveline configurations.

FIG. 4 shows a variety of e-motor driveline configurations, that can be provided with a power management system as disclosed herein. In particular, the two e-motors can be part of a scalable motor configuration that can be augmented by one or more additional e-motors. Scalable, in this context, means that a single e-motor device structure can be used in configurations where the device structure is expanded in parallel or series connections contributing to torque in a power driveline. More particular, similar to the configuration in FIG. 3, a linear driveline can be provided with e.g. one, two, three or four individually coupled single e-motor structures on a single linear shaft that connects to a differential, e.g. for truck load capacities mounting from 7.5-40 tonnes. alternatively, the drivelines can be provided Alternatively a differential may have multiple couplings, e.g. for two shafts opposed to a differential of a single axle, where e.g. the number of e-motors may be balanced on two shafts relative to the differential. Also, more than one axles can be provided with an e-motor device; or e-motors can be coupled directly to the wheels, without an intermediate differential. Contrary to common practice of installing one large e-motor for hybrid and electric trucks, multiple smaller e-motors can thus be mounted and selected according to a requested truck load capacity.

Figure 5:
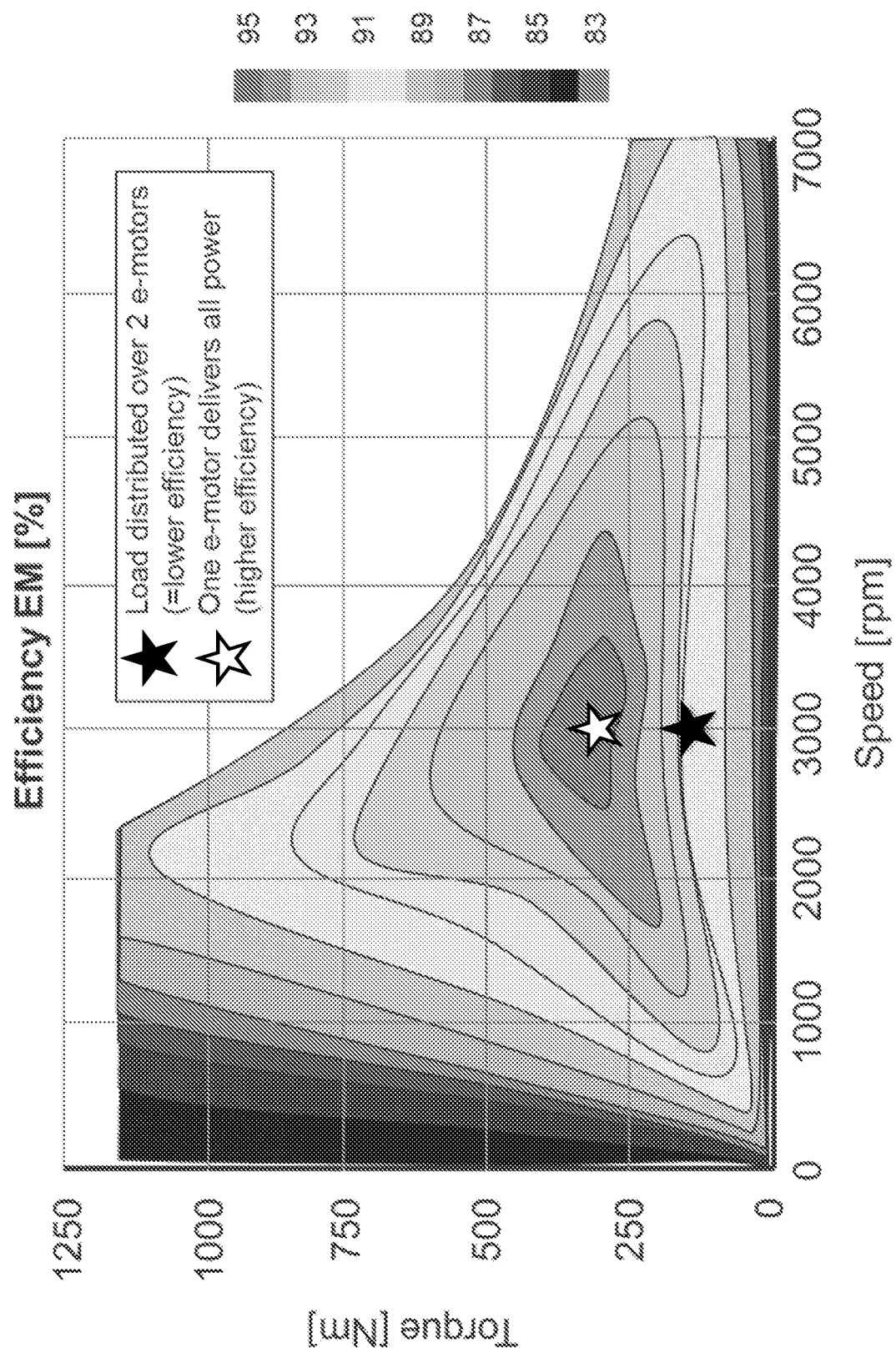
FIG. 5 shows an efficiency graph of torque versus engine speed.

FIG. 5 shows an efficiency graph of torque versus engine speed of a typical e-motor, operating in a 0-7000 rpm range. Typically the best efficiency (that is, electrical power converted to mechanical power) is attained in the 2500-3500 range with typical torques ranging from 250-400 Nm. The graph demonstrates that compared to a load distributed over two powers, it is preferable, from an efficiency point of view to activate a single motor. A typical use case is cruising at 80 km/h where the requested power is moderate and the e-motors with inverters offer opportunity for efficiency improvement and lifetime extension. In this case the power management system is arranged to deactivate a respective one of the two electric motors 3 when the power management system 6 detects that an estimated electric power demanded by one e-motor is lower than the electric power demanded by the two e-motors when each of the at least two e-motor delivers each half of the demanded mechanical power.

This is in contrast to a conventional power splitting strategy, where the requested power is usually equally split over both e-motors resulting in a reduced efficiency that can amount to 5% (red star). An optimized strategy will yield all power with one e-motor (yellow star) and operate in a higher efficiency conversion range of e.g. about 95%, while switching off the other e-motor. This results in an efficiency increase and lifetime extension of the mechanical and electrical components of the e-motor in the drive train. It is important that all e-motors and their inverters degrade gradually over time. It is not desirable that one e-motor is always the prime mover and that the other e-motor is only connected in case of peak powers. To overcome this problem, the power management system may change the preference for e-motor 1 and e-motor 2 on a regular basis. For example on day 1 it may first select e-motor 1 (and e-motor 2 is added for high power demands) and on day 2 it will first select e-motor 2 (and e-motor 1 is added for high power demands). Changing can be done on a daily basis, but also other intervals can be selected. To optimize the lifetime management the power management system accordingly periodically changes its switching strategy to have a different e-motor deliver the requested power and switch off the other e-motor, thereby avoiding that one e-motor wears out quicker than the others. For example, in a first instance, the power management system is arranged to deactivate one of two electric motors, and in another, subsequent instance, the power management system is arranged to deactivate the other of the two electric motors.

Figure 6:
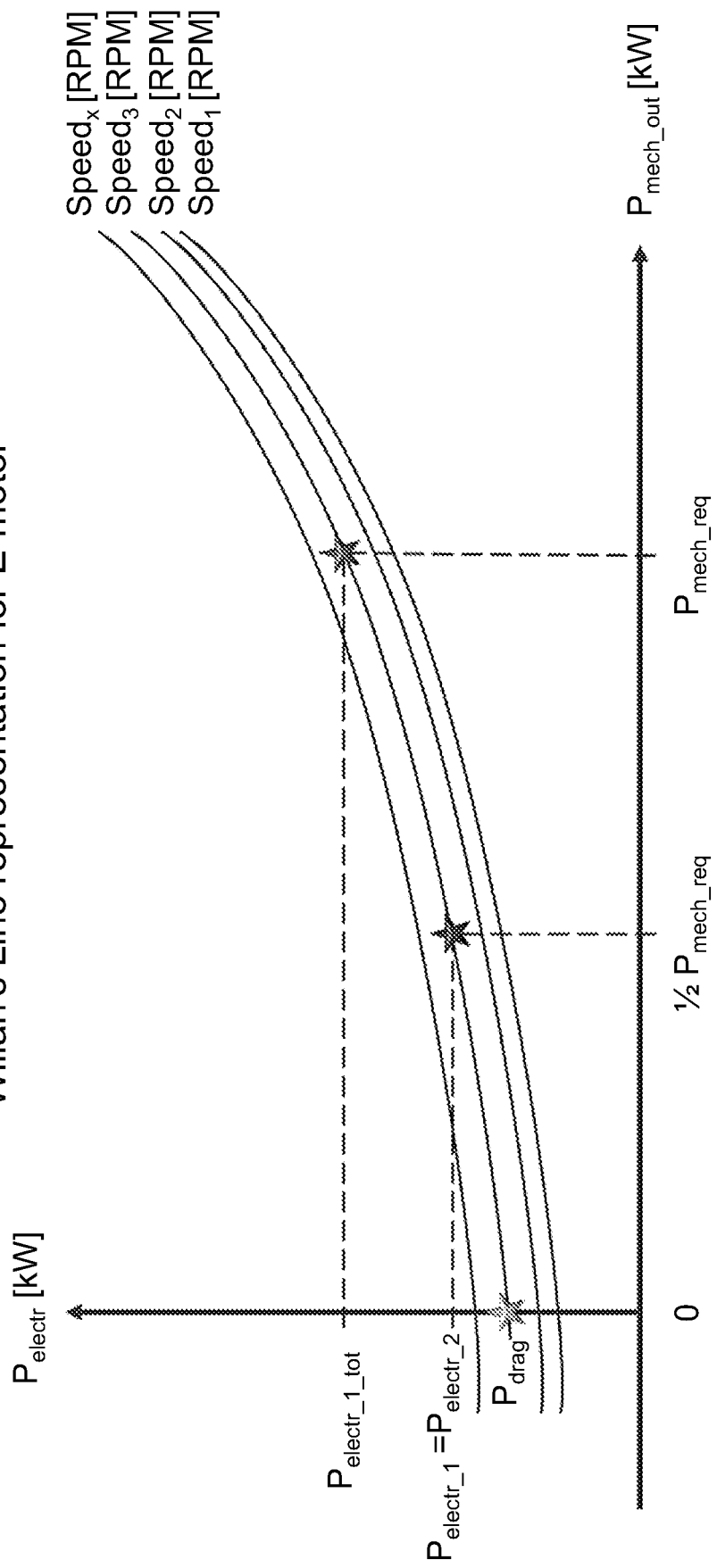
FIG. 6 shows another schematic representation of the efficiency map of an electric motor.

FIG. 6 shows another schematic representation of the efficiency map of an electric motor, wherein for different selective representative speeds respective power graphs illustrate a relation between requested mechanical power and demanded electrical power, in order to deliver the requested power. It is shown that for increasing mechanical powers, a positively increasing, more than linear relationship is established. These graphs also illustrate the drag loss and cogging losses when the e-motor is freely rotating i.e. speed is non-zero but mechanical power demand e.g. torque is zero so output power is zero and efficiency is also zero.

In practical embodiments, the estimated electric power demanded by an e-motor may be derived from a lookup function that derives from a detected torque demand and electric motor speed an electric power demanded from the electric power source based on the illustrated graphs that can be calibrated for a typical motor by measuring for a selected mechanical torque a corresponding electrical power demand.

Figure 7:
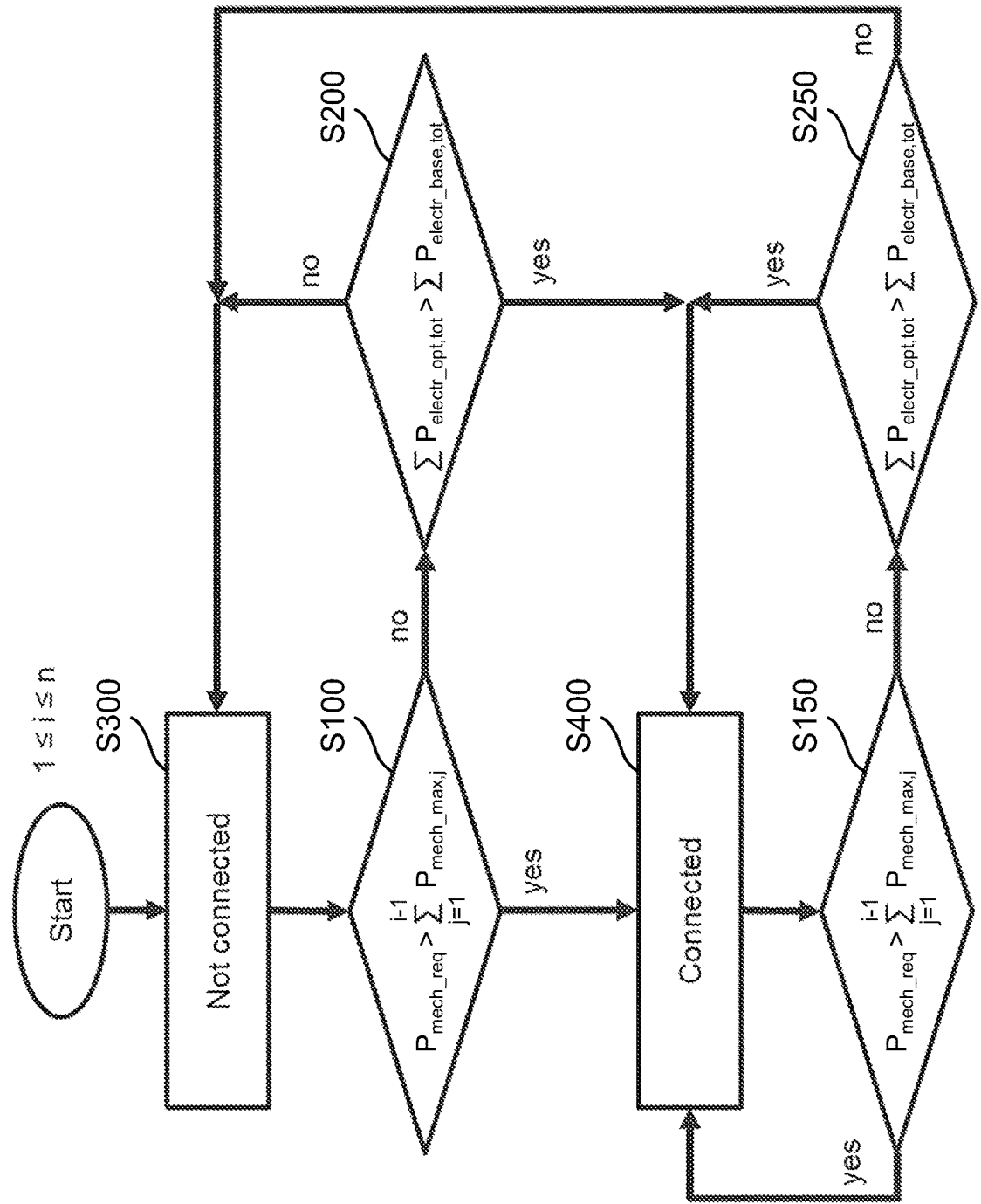
FIG. 7 shows a decision graph for activating or deactivating an electric motor.

FIG. 7 shows a decision graph for activating or deactivating an electric motor in a power management method for an electrically driven vehicle comprising a powertrain of at least two electric motors that can be selectively geared into the powertrain. A conventional scenario may involve all e-motors where the requested torque demand is equally split over all e-motors. When high power is requested, this is a valid approach because all e-motors together are needed to deliver the requested power. During partial load, however, the requested power can be delivered by a subset and switching off one or more e-motors. Optimizing the individual power of each e-motor is done by the energy management strategy.

To this end the power management method comprises the steps of testing (S100) whether mechanical power demanded by the powertrain does not exceed a maximum value for the powertrain having a respective one of said at least two electric motors deactivated; testing (S200) whether the estimated electric power demanded by the powertrain having the respective one of said at least two electric motors deactivated, is lower than the powertrain having the respective one of said at least two electric motors activated and deactivating (S300) one of said at least two electric motors in the affirmative of both tests; or otherwise (S400) activating the respective one of said at least two electric motors. It is noted that 'activating' in this context encompasses 'keeping activated' with a result that a respective e-motor is mechanically coupled into the powertrain and electrically driven. Conversely, 'deactivating' in this context encompasses 'keeping deactivated' with a result that a respective e-motor is mechanically and electrically decoupled.

Conversely, the method encompasses testing (S150) whether mechanical power demanded by the powertrain exceeds a maximum value for the powertrain having a respective one of said at least two electric motors deactivated; or testing (S250) whether the estimated electric power demanded by the powertrain having the respective one of said at least two electric motors deactivated, is higher than the powertrain having the respective one of said at least two electric motors activated and activating (S400) one of said at least two electric motors in the affirmative of any of both tests.

Figure 8:
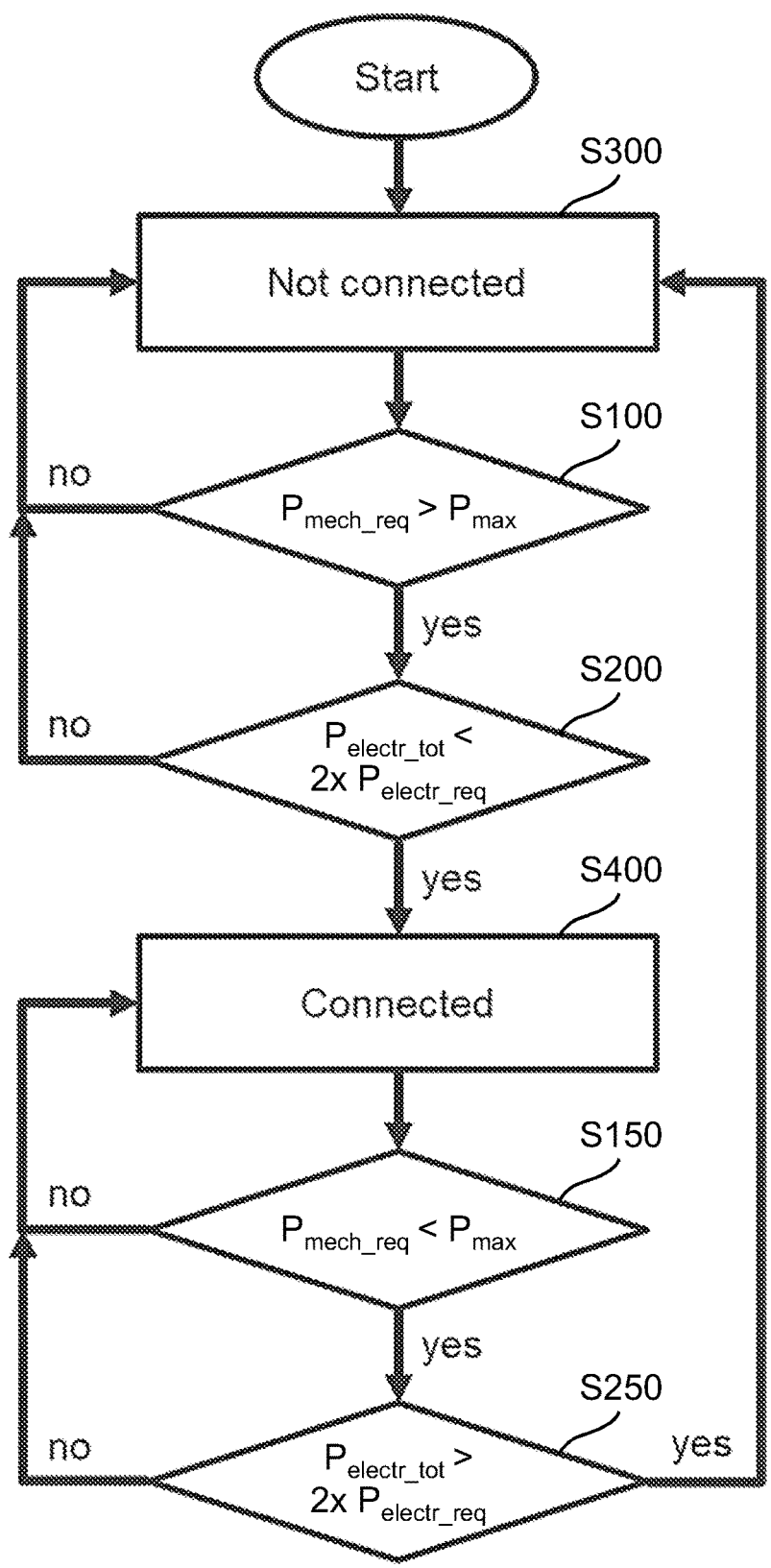
FIG. 8 shows another decision graph for two electric motors.

For a case with two e-motors in the powertrain, as in FIG. 8, this can be further specified. The decisions taken by the control algorithm to switch on/off an e-motor illustrates the situation with 2 e-motors, but it generally holds for more than 2 e-motors. Two conditions need to be satisfied to disconnect one e-motor: 1) the power demand from the driver is lower than the maximum power that one e-motor can deliver and 2) the electric power drawn by one e-motor is lower than the electric power when 2 e-motors deliver each half of the requested power.

Mathematically, this is reflected by the following equations:

Delivering power with only one e-motor is desirable if: $P_{electr\_tot} < 2 \times P_{electr\_req}$ with $P_{electr\_req} = f(P_{mech\_req}, \text{Speed})$ $P_{electr\_tot} = f(2 \times P_{mech\_req}, \text{Speed})$ $P_{mech\_req}$=Mechanical requested power demand from driver $P_{electr\_req}$=Electrical requested power from inverter Thus, the power management method encompasses testing whether the estimated electric power, drawn by one e-motor, estimated by the electrical power demand estimator, is lower than the electric power drawn by two e-motors when each e-motor delivers each half of the requested power; and deactivating a selected one of the two motors in the affirmative.

Further Embodiments

During cruise control driving, a driver is out of the control loop and the power management system installs a smooth mechanical power demand (i.e. no sudden torque increase as could happen with a human driver). In this case there is no need for an extreme fast response from the driveline and some delay is acceptable. With reference to FIG. 8 the power management system may deactivate a further one of the at least two electric motors in case of driving by cruise control, when mechanical power demand indicator 10 is connected to a cruise control system 8. In that case the power management system 6 will calculate an expected demand of electrical power of an extra e-motor by comparing the average value of $P_{mech\_req}$ to $P_{max}$ instead of an actual value of $P_{mech\_req}$. This way it will wait longer before it connects an extra e-motor with inverter to improve efficiency and lifetime. Going further, a driver may select between economy mode and power mode (by means of a button, menu setting, kick-down switch, etc.). In economy mode the energy management algorithm is allowed to switch off an e-motor if this is attractive for efficiency and/or lifetime. This means that the driver accepts in this mode a possible delay in torque response when he/she suddenly presses the throttle pedal. If the driver selects for power mode, the algorithm will never switch off an e-motor. So in this mode, the powertrain will always respond as fast as possible on a torque request from the driver. Usage of vehicle status information, historical info and preview information: the power management system can use this information to automatically switch between economy mode and power mode.

From a driver perspective it is attractive to select permanently for power mode and never for economy mode. But from a fleet-owner perspective, this is not desirable. Therefore it is envisioned to switch automatically to economy mode if the upcoming driving route allows for this. Information that is used to make this decision are: on-board vehicle sensors and state-estimators, historical measurement data, navigation system with preview information. The following examples demonstrate how this information is used to switch automatically between economy mode and power mode:

Drive off: during drive-off from standstill, the driver expects full performance. So when vehicle comes to standstill, all e-motors and inverters will be automatically powered and the driver will not notify any extra delay on a torque request. Once the vehicle reaches cruising speed, it will automatically switch to economy mode, until a new situation is detected which requests for power mode.

Preview info city driving: during city driving, it is reasonable to expect a highly dynamic vehicle speed. From map data it can be determined if the truck is entering a city area and from that moment, the truck automatically selects for power mode. Once the truck leaves the city area and achieves cruising speed, economy mode may be selected again.

Preview info hill climb: if the upcoming road goes up-hill, the algorithm can power-up all e-motors and inverters at an early moment, such that they are ready when the hill climb starts and the driver requests for high torque.

Historical info: log data from the throttle pedal indicates the driving style of the driver. A driver who anticipates properly and operates the throttle pedal gentle will get automatically the economy mode. Contrary, a driver who operates the throttle pedal with high dynamics gets the power mode.

The term "module" as in "storage module" or "receiver module" or "control module" is used to emphasize the modular character of these units, i.e. the functionality of the system may be separated into independent, interchangeable units. The term "user interface" may comprise one or more hardware elements configured to perform operational acts in accordance with the present systems and methods, such as to provide control signals to the various other module components. The processor may be a dedicated processor for performing in accordance with the present system or may be a general-purpose processor wherein only one of many functions operate for performing in accordance with the present system. The processor may operate utilizing a program portion, multiple program segments, or may be a hardware device utilizing a dedicated or multi-purpose integrated circuit. Any type of processor may be used such as a dedicated or shared one. The processor may include microcontrollers, central processing units (CPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

The invention claimed is:

1. A power management system for an electrically driven vehicle, said vehicle comprising a powertrain of at least two electric motors that can be selectively geared into the powertrain by a respective clutch that is coupled to each of said at least two electric motors, and said power management system including an electric power source for powering the at least two electric motors,
    said power management system comprising:
        a mechanical power demand indicator, said mechanical power demand indicator indicating a level of mechanical power demanded from the powertrain, and
        an electrical power demand calculation circuit, that is arranged to estimate an electrical power demand of the electric motors as a function of the demanded mechanical power;
    wherein the power management system is arranged to activate or deactivate one of said at least two electric motors in response to the mechanical power demand indicator,
    wherein the power management system is arranged to deactivate one of the at least two electric motors by mechanically gearing off from the powertrain when the power management system detects;
        that the demanded mechanical power does not exceed a maximum value for the powertrain having one of said at least two electric motors deactivated; and
        that the estimated electric power demanded by the powertrain having the one of said at least two electric motors deactivated, is lower than the estimated electric power demanded by the powertrain having the one of said at least two electric motors activated; or otherwise to activate the one of the electric motors.

2. The power management system according to claim 1, wherein the power management system is arranged to deactivate one of the at least two electric motors when the estimated electric power demanded by one of said at least two electric motors is lower than the estimated electric power demanded by two of said at least two electric motors when each of the two electric motors delivers half of the demanded mechanical power.

3. The power management system according to claim 1, wherein the electric power source comprises a dc-ac inverter device for providing the electrical power demand to one of the at least two electric motors, wherein the inverter device is switched off when the one electric motor is deactivated.

4. The power management system according to claim 3, wherein a high voltage bus of the electric power source includes for at least one of the at least two electric motors a set of main contactors, a pre-contactor and a pre-charge resistor, to physically disconnect the inverter device from the high voltage bus.

5. The power management system according to claim 3, wherein the inverter device includes a power capacitor.

6. The power management system according to claim 3, wherein the inverter device is switched on when the power management system detects that:
    the estimated electric power demanded by the powertrain having the one of said at least two electric motors deactivated, is higher than the powertrain having the respective one of said at least two electric motors activated; or
    a time averaged variability of the mechanical power demand is registered that exceeds a predetermined threshold; or
    the mechanical power demand indicator indicates that the mechanical power demand exceeds a threshold.

7. The power management system according to claim 1, wherein the power management system registers a time averaged variability of the mechanical power demand, and, in case the time averaged variability exceeds a threshold, activates a further one of the at least two electric motors.

8. The power management system according to claim 1, wherein the power management system deactivates a further one of the at least two electric motors in case of driving by cruise control.

9. The power management system according to claim 1, wherein the power management system deactivates a further one of the at least two electric motors irrespective whether the electric power demanded by one electric motor is lower than the electric power demanded by the at least two electric motors when each of the at least two electric motors delivers half of the requested power.

10. The power management system according to claim 1, wherein the power management system is arranged to selectively gear the at least two electric motors into the powertrain by a clutch which is a dog clutch.

11. The power management system according to claim 10, wherein the clutch is physically opened/closed by an electromagnetic actuator.

12. The power management system according to claim 1, wherein the power management system is arranged to power a permanent magnet motor.

13. The power management system according to claim 1, wherein the power management system is arranged to power an induction or asynchronous motor.

14. The power management system according to claim 1, wherein the estimated electric power demanded by the electric motors is derived from a lookup function of a detected torque demand and an electric motor speed, which lookup function increases more than linearly with a requested torque.

15. The power management system according to claim 1, wherein the mechanical power demand indicator is communicatively coupled to an engine gas throttle operated by a driver.

16. The power management system according to claim 1, wherein the at least two electric motors are part of a scalable motor configuration that can be augmented by one or more additional electric motors.

17. The power management system according to claim 1, wherein the power management system is arranged to periodically having a different electric motor deliver requested power and switch off the other electric motor, thereby avoiding that one electric motor wears out quicker than the other.

18. The power management system according to claim 1, wherein the power management system is arranged to detect a driver preference for an economy mode or power mode; and to activate/deactivate an electric motor and inverter according to the driver preference.

19. The power management system according to claim 1, wherein the power management system is arranged to use vehicle status information, historical information and preview information for optimizing a switching strategy which electric motors and inverters deliver the requested power.

20. A power management method for an electrically driven vehicle comprising a powertrain of at least two electric motors that can be selectively geared into the powertrain by a respective clutch that is coupled to each of said at least two electric motors, and that are powered by an electric power source, said power management method comprising the steps of:

testing whether mechanical power demanded by the powertrain does not exceed a maximum value for the powertrain having one of said at least two electric motors deactivated;

testing whether the estimated electric power demanded by the powertrain having the one of said at least two electric motors deactivated, is lower than the estimated electric power demand by the powertrain having the one of said at least two electric motors activated;

and deactivating one of said at least two electric motors in the affirmative of both tests by mechanically gearing off from the powertrain; or otherwise activating the one of said at least two electric motors.

21. The power management method of claim 20, wherein one of two electric motors is deactivated when the estimated electric power drawn by the one electric motor is lower than the electric power drawn by the two electric motors when each of the two electric motors delivers half of the requested power, and said one of two electric motors is activated when the estimated electric power drawn by the one electric motor is higher than the electric power drawn by the two electric motors when each of the two electric motors delivers half of the requested power.

22. A non-transitory computer readable medium having a program of instructions stored thereon for executing, on a data capturing system that comprises a control module, a storage, and a number of data sources registered in the control module, the method of claim 20.

* * * * *